July 11, 1939.  C. P. MAYHEW ET AL  2,165,564

HYDRAULIC BRAKE

Filed Aug. 16, 1937  2 Sheets-Sheet 1

INVENTOR.
Clarence P. Mayhew.
Geo P. Mayhew.
BY Geo Stevens.
ATTORNEY.

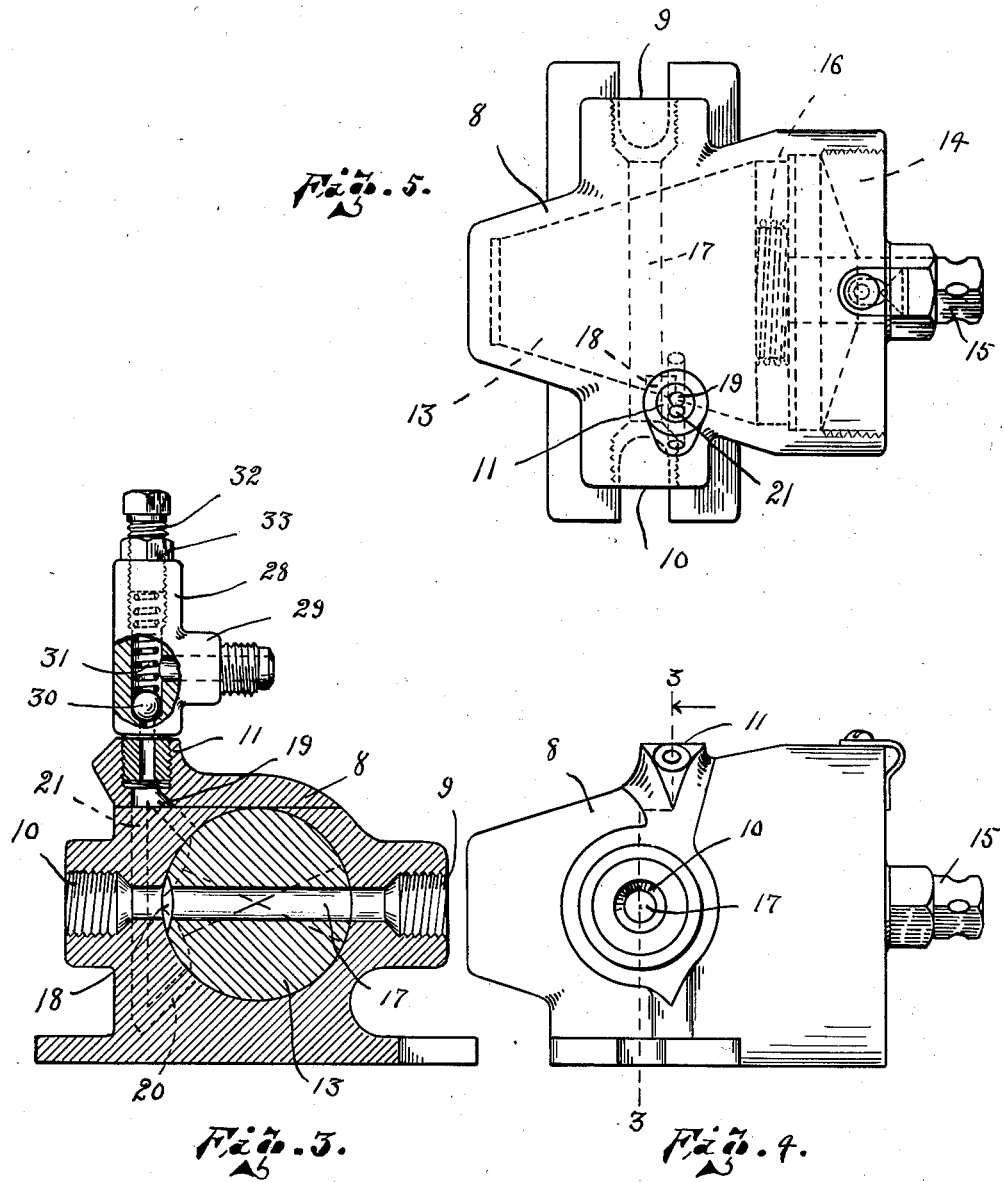

Patented July 11, 1939

2,165,564

UNITED STATES PATENT OFFICE 2,165,564

HYDRAULIC BRAKE

Clarence Paul Mayhew and George Peter Mayhew, Duluth, Minn.

Application August 16, 1937, Serial No. 159,236

2 Claims. (Cl. 188—152)

This invention relates to hydraulic brakes for automobiles and has special reference to an auxiliary unit applicable to a number of different types of hydraulic brakes for vehicles.

The principal object of the invention is to provide simple means convenient for such application that will function to relieve the pressure on the front wheels of a vehicle automatically with the turning of the steering wheel of the vehicle.

Other objects and advantages of the invention will appear in the following description thereof.

Referring now to the accompanying drawings, forming part of this application, and wherein like reference characters indicate like parts:

Figure 3 is a section on the line 3—3, Figure 4, also showing partially in section an optional form of connecting unit with the reservoir of the hydraulic system.

Figure 4 is a side elevation of the unit looking from the forward end of the vehicle.

Figure 5 is a top plan view of the unit, omitting the optional connection shown in Figure 3.

Figure 1:
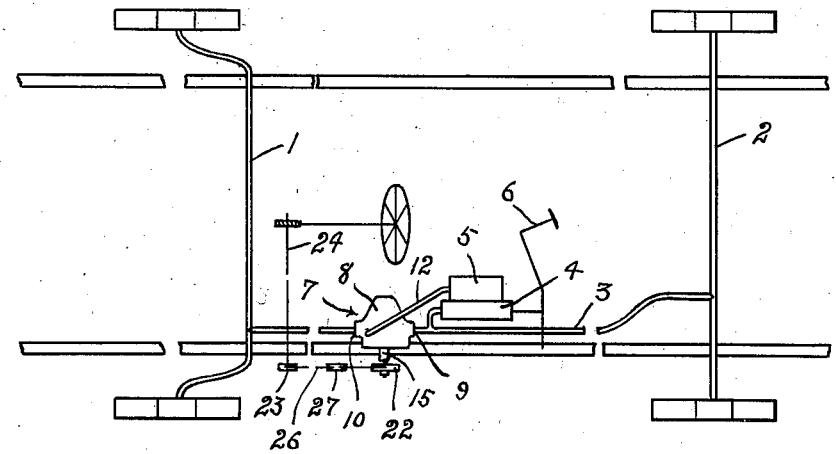
Figure 1 is a plan lay-out of a common hydraulic brake system for vehicles illustrating the relative position of our invention as applied thereto.

In Figure 1, the numerals 1 and 2 represent the transverse fluid pipe connections to the front and rear wheels, respectively, of a vehicle, and these pipes are, as is usual in such installations, connected as by the main supply pipe 3, leading directly from the master cylinder 4 of the hydraulic brake system, and 5 represents the reservoir or fluid supply tank for the system. The piston in the master cylinder is controlled by the action of the foot lever indicated at 6, and this general arrangement indicates that of any well known type of hydraulic brake control means for vehicles.

To such an arrangement or system we have illustrated, in outline in this figure, our auxiliary front wheel control unit shown at 7, it being connected at opposite sides within the main line pipe 3 so that fluid passing to the front brakes of the vehicle, or from same, must pass therethrough.

The auxiliary device comprises the frustroconically shaped housing 8, having an intake connection 9 with the pipe 3, and, opposite to same, a similar connection 10 with that portion of the pipe 3 leading to the front brakes of the vehicle. This housing is also provided with a discharge connection illustrated at 11 with the pipe 12 leading directly to the reservoir 5 of the brake system, this discharge connection being connected with certain passageways in the housing 8, which will be described later.

Within the housing 8 is rotatably mounted the frusto-conically shaped rotor or rockable member 13, it being held therein, for example, as by the screw threaded closure 14 of the enlarged opening in the housing, and which closure surrounds the stem-like extension 15 of the rotor, intermediate of which closure 14 and the shoulder of the rotor about the stem 15 is installed an expansive helical spring 16 for the purpose of keeping the rotor in snug non-leaking relation to the interior of the housing, and which, obviously, is readily adjustable.

Figure 2:
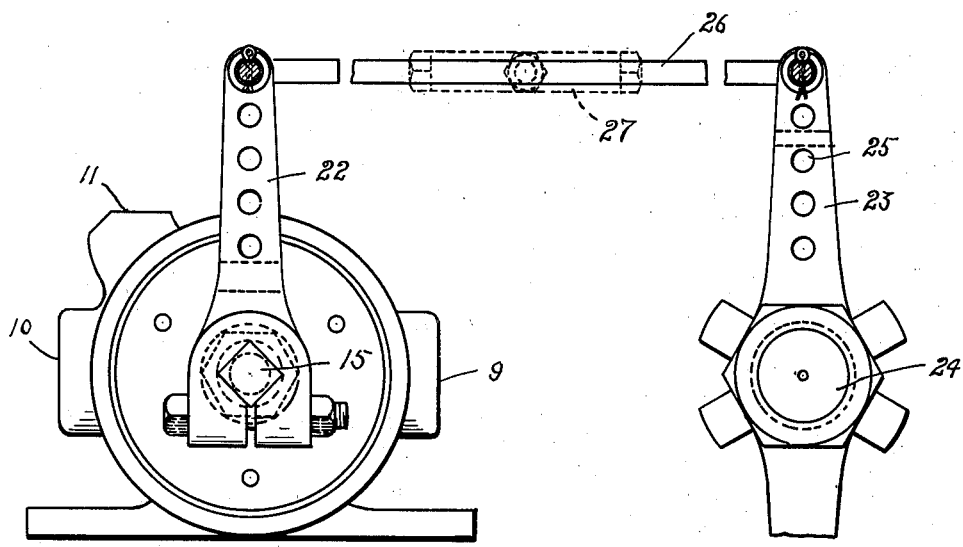
Figure 2 is an enlarged front elevation of one of the auxiliary units and one form of connection from the steering wheel of the vehicle thereto.

This rotor has formed diametrically therethrough the passageway 17 which normally remains in axial alignment with the main pipe line 3 as well as, of course, with the connections 9 and 10. This passageway, at what we will refer to as the discharge end, that is the end leading to the front brake pipe line, is provided with an arcuate enlargement 18, as seen in Figure 3, though, of course, at but one side of the end of the passageway as seen in dotted lines, Figure 5, to register alternately with the branch by-pass ports 19 and 20, both of which communicate with the main by-pass 21 formed to one side of the through connection 10. This port 18 is for the purpose of allowing fluid to return from the forward pipe line back to the reservoir when the rotor 13 is turned to either of its adjusted positions as clearly seen in dotted lines Figure 3. This turning of the rotor 13 is accomplished by any suitable connection with a rotating member, such as the pitman arm shaft of the steering mechanism of the vehicle, or any other element thereof alternately rotated by the action of the steering mechanism. As one practical form of such connection we have illustrated in Figure 2 an upstanding lever 22 as attached to the stem 15 of the rotor 13, and a similar lever 23 attached to the pitman arm shaft 24, these levers each having a series of holes 25 therethrough for selective engagement with the ends of the connecting rod 26 which may be provided with a turnbuckle connection 27 for further delicate adjustment. Obviously the ends of the rod 26 may be attached to the levers 22 and 23 in any desired manner to govern the throw of the lever 22 and extent of movement of the rotor 13, thereby regulating the release of fluid to the front brakes of the vehicle.

As a further means for governing such release we have illustrated in Figure 3 the T-shaped connection 28, screw threadedly attached to the housing 8 of the auxiliary unit at the discharge connection 11, and the lateral branch 29 thereof connected to the return pipe 12 to the reservoir. Within the body portion of this T-shaped connection 28 is incorporated the ball valve 30 controlled by the expansive helical spring 31 above same, and which spring is adjustable as by the screw-threaded plug 32 and held in any predetermined position as by the lock nut 33, so that in this manner the pressure of the discharge from the auxiliary unit back to the reservoir 5 may be predetermined. However the device is deemed to function admirably without such delicate control.

By such mechanism it is apparent that when the brakes are applied during a straight-away course of the vehicle, equal pressure will occur on all four brakes thereof, but when the steering mechanism is turned, either while the vehicle is in motion, or while waiting to make a turn, either of the by-pass ports in the auxiliary device will function to release the pressure on the front wheels and the direct connection thereto from the master cylinder is shut off, and, as previously described, should it be desired to govern the amount of such release apart from that derived through the adjustment of the ports in the auxiliary device, the pressure gauge referred to at 28 may be employed in the connection between the auxiliary unit and the reservoir.

Having thus described our invention, what we claim and desire to secure by Letters Patent, is:

1. In a fluid operated braking system for vehicles including a fluid reservoir, a master cylinder operable by the brake lever of the vehicle, and fluid lines leading from the master cylinder to the wheel brakes, the combination therewith of a housing installed within the fluid line leading to the front wheel brakes, said housing having a tapered bore therein and a by-pass port communicating therewith, a tapered plug within said bore, and having a passageway therethrough optionally communicable with said by-pass, a fluid line from said housing to said reservoir, said plug being operable by steering mechanism of the vehicle to cause fluid in the line to the front wheel brakes to by-pass in said housing and fluid line therefrom to said reservoir when the steering mechanism is turned and the brakes applied said means also functioning to prevent seepage from said master cylinder to said reservoir.

2. In a fluid operated braking system for vehicles including a fluid reservoir, a master cylinder operable by the brake lever of the vehicle, fluid lines leading from the master cylinder to the wheel brakes, and steering mechanism for said vehicle, the combination therewith of a housing having a tapered bore therein installed within the fluid line leading to the front wheel brakes, a tapered rotor within the bore of said housing and rotatable by said steering mechanism, a passageway through said rotor normally communicating with the connections of said fluid line to said housing and optionally communicating with the hereinafter mentioned by-pass, a by-pass through said housing, a fluid line from said by-pass to said reservoir, said tapered rotor being operable by the steering mechanism to cause fluid in said line to the front wheel brakes to return to the reservoir through said by-pass and line therefrom to the reservoir, when the steering mechanism is turned and the brakes applied.

CLARENCE P. MAYHEW.
GEORGE P. MAYHEW.